United States Patent
Werner et al.

(10) Patent No.: US 10,237,019 B2
(45) Date of Patent: *Mar. 19, 2019

(54) VARIABLE TRANSPORT FORMAT PARAMETERS FOR FAST ACKNOWLEDGMENT FEEDBACK MECHANISM

(71) Applicant: Telefonaktiebolaget LM Ericsson (publ), Stockholm (SE)

(72) Inventors: Karl Werner, Segeltorp (SE); Robert Baldemair, Solna (SE); Håkan Björkegren, Täby (SE); Erik Dahlman, Stockholm (SE); Stefan Parkvall, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 118 days.

This patent is subject to a terminal disclaimer.

(21) Appl. No.: 15/109,579

(22) PCT Filed: May 3, 2016

(86) PCT No.: PCT/SE2016/050388
§ 371 (c)(1),
(2) Date: Jul. 1, 2016

(87) PCT Pub. No.: WO2017/192072
PCT Pub. Date: Nov. 9, 2017

(65) Prior Publication Data
US 2018/0109355 A1 Apr. 19, 2018

(51) Int. Cl.
*H04L 1/18* (2006.01)
*H04L 1/00* (2006.01)
(Continued)

(52) U.S. Cl.
CPC .......... *H04L 1/0061* (2013.01); *H04L 1/0041* (2013.01); *H04L 1/0045* (2013.01);
(Continued)

(58) Field of Classification Search
CPC ...................................... H04L 1/1809
(Continued)

(56) References Cited

U.S. PATENT DOCUMENTS

| | | | |
|---|---|---|---|
| 7,069,483 B2 * | 6/2006 | Gillies | H04L 41/046 |
| | | | 714/712 |
| 8,953,550 B2 * | 2/2015 | Dinan | H04W 72/0406 |
| | | | 370/329 |

(Continued)

FOREIGN PATENT DOCUMENTS

| | | |
|---|---|---|
| CN | 104780029 A | 7/2015 |
| EP | 1873952 A1 | 1/2008 |

(Continued)

*Primary Examiner* — Fritz Alphonse
(74) *Attorney, Agent, or Firm* — Murphy, Bilak & Homiller, PLLC

(57) ABSTRACT

A first communication node (110) receives a stream of code blocks from a second communication node (120) over an acknowledged connection (131.). The first communication node processes the received code blocks in accordance with at least one transport format parameter, TFP, detects errors in received code blocks, and transmits an acknowledgment in respect of groups of code blocks indicating whether at least one error was detected in the group. A first subset of the code blocks of a group are transmitted (e.g., modulated and demodulated) in accordance with a first TFP value, and a remainder of the code blocks are transmitted in accordance with a second TFP value. Because the first and second TFP values are independent, it is possible either to shorten the necessary processing time in the first communication node or, in connection with a predictive acknowledgment mechanism, to make the receiving-side processing of code blocks (Continued)

that do not contribute to the value of the transmitted acknowledgment more robust.

27 Claims, 7 Drawing Sheets

(51) Int. Cl.
*H04L 1/08* (2006.01)
*H04W 28/04* (2009.01)

(52) U.S. Cl.
CPC .............. *H04L 1/0089* (2013.01); *H04L 1/08* (2013.01); *H04L 1/1854* (2013.01); *H04W 28/04* (2013.01)

(58) Field of Classification Search
USPC ......................................... 714/748, 749, 746
See application file for complete search history.

(56) References Cited

U.S. PATENT DOCUMENTS

| | | |
|---|---|---|
| 2002/0080806 A1 | 6/2002 | Haggard |
| 2002/0149496 A1 | 10/2002 | Dabak et al. |
| 2005/0066255 A1 | 3/2005 | Jiang |
| 2006/0187870 A1 | 8/2006 | Zhu et al. |
| 2007/0030799 A1 | 2/2007 | Kaburaki et al. |
| 2008/0176591 A1 | 7/2008 | Fujimoto |
| 2008/0259964 A1 | 10/2008 | Tomita |
| 2008/0317146 A1 | 12/2008 | Kwon et al. |
| 2009/0274139 A1 | 11/2009 | Palanki |
| 2013/0315235 A1 | 11/2013 | Foo et al. |
| 2016/0323068 A1* | 11/2016 | Yu ........................ H04L 1/1628 |

FOREIGN PATENT DOCUMENTS

| | | |
|---|---|---|
| EP | 2104258 A2 | 9/2009 |
| WO | 2007059201 A2 | 5/2007 |

* cited by examiner

VARIABLE TRANSPORT FORMAT PARAMETERS FOR FAST ACKNOWLEDGMENT FEEDBACK MECHANISM

TECHNICAL FIELD

Disclosed herein are techniques for facilitating digital communication over an error-prone connection between two communication nodes. In particular, there is proposed a predictive and a non-predictive acknowledgment feedback mechanism for such a connection.

BACKGROUND

Wireless networks standardized by Third Generation Partnership Long Term Evolution (3GPP LTE) implement ARQ (Automatic Repeat Request) or hybrid-ARQ (HARQ), from which HARQ also includes forward error correction. HARQ is used in HSDPA and HSUPA, which provide high-speed data transmission for mobile phone networks such as UMTS, and in the IEEE 802.16-2005 standard for mobile broadband wireless access, also known as "mobile WiMAX". It is also used in EVDO and LTE wireless networks.

In systems of this type, terminals are required to send acknowledgment feedback to the network indicative of a result of decoding a transport block or codeword (ACK/NACK or ACK/NAK feedback). The ACK/NACK related to downlink transmissions is transmitted on the uplink. The feedback is used to trigger fast retransmissions. In LTE frequency-division duplex (FDD), as schematically depicted in FIG. 6, a terminal is required to transmit ARQ or hybrid-ARQ acknowledgment related to downlink subframe n in uplink subframe n+4. In FIG. 6, $T_P$ denotes a propagation delay from the access node to the terminal; $T_{TA}$ denotes an offset separating the start of an uplink subframe relative to the start of a corresponding downlink subframe at the terminal; $T_{UE}$ is the processing time available to the terminal; and $T_{eNB}$ is the processing time available to the access node. This allows the terminal between 2 and 3 ms for decoding the transport block and preparing the uplink transmission that carries the ACK/NACK. The exact time depends on timing advance settings.

FIG. 7 illustrates a timing relationship between downlink data and uplink hybrid-ARQ acknowledgment for time-division duplex (TDD). In fact, the acknowledgment transmitted in uplink subframe 7 is bundled, and will be positively valued only if both of the downlink transmissions in subframe 0 and 3 are correctly decoded.

In LTE, as outlined in FIG. 8, a transport block comprises one or more code blocks. Each received code block needs to be correctly decoded, i.e. decoded without detected errors, in order for the transport block to be deemed correctly decoded. A cyclic redundancy check (CRC) value is inserted into each code block. The CRC makes it possible for the terminal to determine whether it has been correctly decoded or not.

It is expected that future radio access ("5G") transport blocks will be structured in a similar way. For some services foreseen for 5G, however, the delay associated with ACK/NACK signaling as currently practiced in LTE will not be acceptable. More precisely, it is expected that the time allowed for the terminal to decode a transport block and transmit ACK/NACK feedback may be significantly reduced compared to LTE, possibly down to tens of microseconds. In some proposed deployments of 5G networks, terminals may be required to send ACK/NACK feedback to the network before any further downlink or uplink signaling can take place. This means that the frame structure must leave some guard time to allow for decoding of the transport block. In a typical implementation, the time required to decode a code block once all its orthogonal frequency-division multiplexing (OFDM) symbols have been received corresponds approximately to the duration of one OFDM symbol. Guard times of this order of magnitude would be wasteful of system resources. It is therefore desirable to expedite the terminal's transmission of ACK/NACK feedback.

SUMMARY

In view of the state of the art outlined in the preceding section, the invention proposes devices, methods, computer programs and computer program products, as defined by the independent claims.

A first communication node will be considered which is adapted for acknowledged connection to a second communication node and comprises at least a receiver, at least one processor and a transmitter. The connection is a wireless or wired connection over a medium that is known or expected to generate some amount of transmission errors or other errors during normal operation. A purpose of an acknowledgment mechanism is to monitor and correct such errors. The first communication node is located on a receiving side of the connection, in the sense that it receives payload data. Certainly the first communication node also transmits data to the second communication, such as acknowledgments. Moreover, the acknowledged connection may be a full or partial duplex connection, wherein payload data flows in both directions.

In the first communication node, the receiver is configured to receive a predefined group of code blocks from the second communication node. To enable the first communication node to detect errors, either a check value is associated with each code block or a check value is associated with each predefined group of code blocks. Referring to the first option, a code block in 3GPP LTE is the lowest level on which CRC insertion can be performed. In this disclosure including the appended claims, "code block" denotes, for any communication system, the smallest unit that the system associates with an independent check value. It is noted that the term "code block" is used in a forward-looking sense, to include also future equivalents, in particular, the smallest unit associated with an independent check value in a 5G wireless communication system, whether or not such unit is referred to specifically as a "code block". Sequential ordering of the code blocks is no essential feature of this invention; indeed, information from two or more code block may be mapped to one modulation symbol in 3GPP LTE, so that arguably their respective transmission times are indistinguishable, and this fact is not expected to change in future radio access technologies.

The at least one processor is configured, on the one hand, to process the received code blocks in accordance with at least one transport format parameter (TFP) and, on the other hand, to detect errors in the received code blocks using the check value or check values. When check value insertion has been done on group level, then the at least one processor performs error detection for an entire group of code blocks at a time. When check value insertion has been done on code block level, then the at least one processor performs error detection for one code block at a time and combines the error detection result into a total error for the group of code blocks. For instance, the first communication node may be configured to transmit a negatively valued acknowledgment for a predetermined group as soon as an error has been detected for any the code blocks in the predefined group. If the at least one processor produces error detection results e1, e2, e3, e4, e5, from which a positive value signifies the presence of an error, then the processor(s) may proceed to combine these as e1 OR e2 OR e3 OR e4 OR e5. This expression is positive as soon as one of the error detection results is positive.

The transmitter is configured to transmit to the second communication node an acknowledgment indicating whether at least one error was detected in said predefined group of code blocks, wherein a negative value of the acknowledgment signifies that an error was detected for the predefined group or for at least one of the code blocks therein. The invention is applicable also in a network where acknowledgments are exchanged under the assumption that a positively valued acknowledgment signifies that the number of detected errors per predefined group is less than or equal to a pre-agreed threshold (e.g., 2, 3 or 4 errors), and a negatively valued acknowledgment signifies that the pre-agreed threshold has been exceeded. The invention is furthermore applicable in a network where acknowledgments are exchanged under the assumption that a positively valued acknowledgment signifies that no errors or only corrigible errors have been detected, and a negatively valued acknowledgment signifies that at least one non-corrigible error has been detected.

The predefined groups may be defined in such manner that the transmitter is required or expected to transmit an acknowledgment for each predefined group, as may be laid down in a network standard or may be pre-agreed between the parties operating the first and second communication nodes.

In one embodiment, the at least one processor is operable to apply a first TFP value for a first subset of the code blocks of a predefined group and a second TFP value for a remainder of the code blocks of the predefined group. The first and second TFP values may be independent in the sense that they need not be equal, but may be permitted to be equal temporarily during operation of the first communication node. The first and second TFP values may be independent in the sense that they are different, yet without being required to be different at all times. The first and second TFP values may be independent in the sense of being independently assignable. Furthermore, the embodiment encompasses a communication node where the values are not required to be in a particular numerical relationship to another, but may be allowed to be in such relationship to simplify an implementation or reduce signaling overhead; for example, the first and second TFP values may be related by a constant multiplicative factor or by a constant additive offset. This embodiment also includes implementations where the values are signaled in a format where the first TFP value is encoded explicitly and the second is encoded in terms of its difference (or ratio) with respect to the first TFP value.

A first communication node which is operable to apply different TFP values for different code blocks within a predefined group of code blocks, as this embodiment provides, may be able to transmit the acknowledgment earlier than corresponding equipment according to the state of the art. Indeed, for one or more code blocks that limit the time required to transmit the acknowledgment, the TFP may either be set so as to shorten their processing time. Alternatively, if error detection is done on a code block basis, the TFP for such code block(s) is set so as to make their processing more robust, reducing their likelihood of errors to such an extent that their error status need not contribute to the substantive content of the acknowledgment; the acknowledgment may therefore be transmitted earlier than with available technology. The fact these possible TFP modifications are not applied to all code blocks in a predefined group may help preserve the link spectral efficiency.

As a possible further development within the scope of this embodiment, the at least one processor may be operable to apply a first TFP value for a first subset of the code blocks of a predefined group, a second TFP value for a second subset of the code blocks of the predefined group, and a third TFP value for a remainder of the code blocks of the predefined group. In a case where N TFP values are used, the remainder is what is left after the first, second etc. up to the $(N-1)^{th}$ subset of code blocks have been removed from the predefined group of code blocks. The remainder may alternatively be described as the complement of the union of the first subset and any second, third, fourth etc. subsets; this implies that the union of the remainder and all subsets is equal to the predefined group. The location of the remainder may be initial or final in the predefined group, inside the predefined group or a union of disjoint sets of code blocks.

In another aspect, there is provided a method to be executed in a first communication node for receiving a stream of code blocks from a second communication node over an acknowledged connection. The method comprises: receiving a stream of code blocks from the second communication node, wherein each code block or each predefined group of code blocks is associated with a check value enabling error detection and belongs to a predefined group of code blocks; processing the received code blocks in accordance with at least one TFP; detecting errors in received code blocks using the check value or check values; and transmitting to the second communication node an acknowledgment in respect of each predefined group of code blocks, wherein a negative value of the acknowledgment signifies that an error was detected for at least one of the code blocks in the predefined group. In an embodiment, the processing includes applying a first TFP value for a first subset of the code blocks of a predefined group and a second TFP value for a remainder of the code blocks of the predefined group, wherein the first and second TFP values are independent.

Turning to the transmitting side, a second communication node adapted for acknowledged connection to a first communication node comprises a transmitter, a receiver and at least one processor.

In the second communication node, the at least one processor is configured to process the code blocks in accordance with at least one TFP; to group the processed code blocks into predefined groups, and associate each code block or each predefined group with at least one check value. It is noted that the check value may be inserted by the at least one processor or may be present since the completion of upstream processing steps.

The transmitter is configured to transmit the predefined groups the code blocks.

The receiver is configured to receive from the first communication node an acknowledgment in respect of one of the predefined groups of transmitted code blocks. The receiver is furthermore configured to cause the transmitter to retransmit said predefined group of transmitted code blocks in response to a received negatively valued acknowledgment.

In one embodiment, the at least one processor of the second communication node is further configured to process a first subset of the code blocks of a predefined group in accordance with a first TFP value and to process a remainder of the code blocks of the predefined group in accordance with a second TFP value, which is independent of the first TFP value. As discussed above, the independence of the two or more TFP values basically means that they are allowed to be different, though not obliged to be always different during operation; alternatively, they are allowed to be non-equal but also allowed to be temporarily equal. TFP values also remain "independent" in the sense of the appended claims even if, in the interest of reducing signaling overhead, they are related by a constant factor or offset.

Because the at least one processor of the second communication node accepts independent TFP values, the processing in die first communication node is expedited in a way likely to accelerate its transmission of the acknowledgment in respect of a predefined group of code blocks, as discussed above. The second communication node will benefit from this in that it is likely to receive the acknowledgment earlier than it would with available technology. This may reduce the average time that not yet acknowledged data needs to be buffered in the second communication node. Independently of the advantage in terms of buffer space use, a decrease in the average time to acknowledgment may also reduce the likelihood of the so-called window stall phenomenon. As will be further explained below, if the average acknowledgment time is reduced, fewer overhead need to be devoted to sequence numbering and/or a higher maximum stall-free data rate may be permitted. The fact that a potentially costlier TFP value need not be applied to all code blocks in a predefined group helps preserve link efficiency.

In another aspect, there is provided a method implemented in a first communication node for transmitting a stream of code blocks to a first communication node. The method comprises: processing the code blocks in accordance with at least one transport format parameter, TFP; grouping the processed code blocks into predefined groups and associating each code block or each predefined group of code blocks with a check value; transmitting the predefined groups of code blocks; receiving an acknowledgment in respect of one of the predefined groups of transmitted code blocks, from the first communication node; and retransmitting said predefined group of transmitted code blocks if the acknowledgment is negatively valued. In an embodiment, the processing includes applying a first TFP value for a first subset of the code blocks of a predefined group and applying a second TFP value for a remainder of the code blocks of the predefined group, wherein the first and second TFP values are different.

In another aspect, there is provided method implemented in a second communication node for transmitting a stream of code blocks to a first communication node. The method comprises: processing the code blocks in accordance with at least one transport format parameter, TFP; grouping the processed code blocks into predefined groups and associating each code block or each predefined group of code blocks with a check value; transmitting the predefined groups of code blocks; receiving from the first communication node an acknowledgment in respect of one of the predefined groups of transmitted code blocks; and in response to a negatively valued acknowledgment, retransmitting (505) said predefined group of transmitted code blocks. In an embodiment, said processing includes applying a first TFP value for a first subset of the code blocks of a predefined group and applying a second TFT value for a remainder of the code blocks of the predefined group, wherein the first and second TFP values are different.

In other aspects, there are also provided a computer program and a computer-readable medium carrying this computer program.

It is noted the invention relates to all combinations of features, even if recited in mutually different claims.

BRIEF DESCRIPTION OF THE DRAWING

Embodiments will now be described in greater detail and with reference to the accompanying drawings, on which.

DETAILED DESCRIPTION OF EMBODIMENTS

Within the context of the present disclosure, the term "communication network" or short "network" may particularly denote a collection of nodes or entities, related transport links, and associated management needed for running a service, for example a telephony service or a packet transport service. Depending on the service, different node types or entities may be utilized to realize the service. A network operator owns the communication network and offers the implemented services to its subscribers. Typical examples of a communication network are radio access network (such as WLAN/Wi-Fi and cellular networks like 2G/GSM, 3G/WCDMA, CDMA, LTE), mobile backhaul network, or core network such as IMS, CS Core, PS Core.

Within the context of the present disclosure, each of the term "user equipment" (UE) and "wireless communication device" refers to a device for instance used by a person for his or her personal communication. It can be a telephone-type of device, for example a telephone or a SIP phone, cellular telephone, a mobile station, cordless phone, or a personal digital assistant type of device like laptop, notebook, notepad equipped with a wireless data connection. The UE may also be associated with non-humans like animals, plants, or even machines, and may then be configured for machine-type communication (MTC), which is also referred to as machine-to-machine (M2M) communication, device-to-device (D2D) communication or sidelink. A UE may be equipped with a SIM (Subscriber Identity Module) comprising unique identities such as IMSI (International Mobile Subscriber Identity) and/or TMSI (Temporary Mobile Subscriber Identity) associated with a subscriber using the UE. The presence of a SIM within a UE customizes the UE uniquely with a subscription of the subscriber.

Within the context of the present disclosure, each of the terms "base station" and "wireless access node" refers to a node of a radio access network that is used as interface between land-based transport links and radio-based transport links, wherein the radio-based transport link interfaces directly with a UE. For example, in a GSM/2G access network a base station refers to a BTS, in a WCDMA/3G access network a base station refers to a NodeB, and in a LTE access network a base station refers to a eNodeB. In WLAN/Wi-Fi architecture, a base station refers to an Access Point (AP).

The invention may be put to use in any node in a network that implements transmitter or receiver functionality. One typical implementation is in a UE and relates to processing of a downlink transport blocks with ACK/NACK feedback transmitted on uplink. Another implementation may be in multi-hop backhauling between network nodes, where fast feedback is essential.

Figure 1:
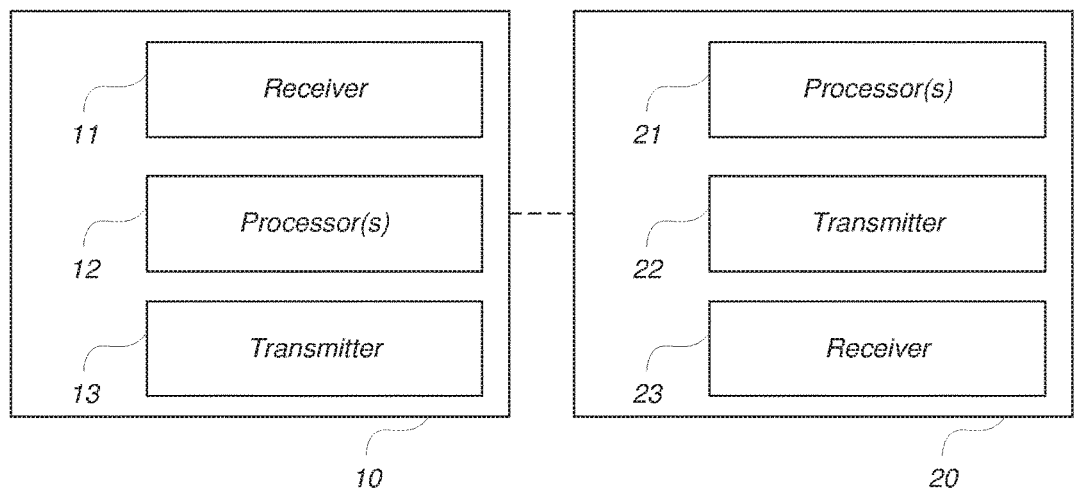
FIG. 1 illustrates a first and a second communication node communicating over a wired or wireless acknowledged connection.

FIG. 1 shows two communication nodes 10, 20 operable to be communicatively connected by a wireless or wired connection, as indicated by the dashed line. The connection may be an acknowledged connection in the sense that some errors are monitored and the transmitting side is configured to retransmit a predefined group of code blocks in response to a request by the receiving side. The connection may as well comprise a retransmission protocol, such as a higher-layer retransmission protocol; one example, in LTE, is the Radio Link Control (RLC) protocol, through which may be requested retransmission of RLC protocol data units, which are typically significantly larger than LTE code blocks.

The first communication node 10 comprises a receiver 11 configured to receive a predefined group of code blocks from the second communication node, wherein each code block or the predefined group of code blocks is associated with a check value enabling error detection. Accordingly, the first communication node 10 is configured to operate for check value insertion on the level of a code block or a predefined group. While check value insertion may optionally be implemented on larger units than the predefined group of code blocks discussed here, the first communication node 10 is preferably configured to disregard any check values that are associated with smaller units than the code blocks. The predefined group comprises code blocks encoded by modulation symbols. In some embodiments, the first communication node 10 may be configured to process predefined groups encoded by consecutive modulation symbols, such as OFDM symbols. It is noted that there is generally no stable numerical relationship between modulation symbols and code blocks: it may be envisioned that one code block is encoded by one or more modulation symbols, and conversely, one modulation symbol may carry data from one or more code blocks.

The first communication node 10 further comprises at least one processor 12, such as a single processor, a multi-core processor, a group of cooperating processors, or processing circuitry. The at least one processor 12 is configured to, on the one hand, process the received code blocks in the predefined group in accordance with at least one TFP, and, on the other, to detect errors in the received code blocks using the check value or check values. The processing of the received code blocks may include decoding symbols in the code blocks. The check value may be one of: a parity bit, a hash value, a checksum value, a cyclic redundancy check value, CRC value; for each of these examples, the error detection may include recomputing the check value in an equivalent fashion as was done on the transmitting side (or equivalently, by an algorithm on which the communicating parties have agreed in advance) and assessing whether it is equal to the received check value. The error detection may be an integrated stage of a demodulation process.

The first communication node 10 moreover comprises a transmitter 13 configured to transmit to the second communication node 20, based on whether errors were detected, an acknowledgment in respect of each of said predefined groups of code blocks. For the purpose of this presentation, it is agreed that a negative value of the acknowledgment signifies that an error was detected for at least one of the code blocks in the predefined group. The negative value of the acknowledgment may have the effect of triggering a retransmission. In the case where errors are detected on code-block level check, a TRUE error detection result may denote, depending on the implementation, either that the concerned code block was error free (agreement with the received check value) or contained an error (disagreement with the received check value), and similarly, it is a matter of convention whether a TRUE value of a combination of error detection results denotes that all code blocks were decoded satisfactorily or with one or more errors. Either way, it will be within the abilities of one skilled in the art to identify a logical operation, such as OR, NOR, AND or NAND with two or more input variables, that provides the desired combined error detection result.

In an embodiment, the at least one processor 12 is operable to apply a first TFP value for a first subset of the code blocks of a predefined group and a second TFP value for a remainder of the code blocks of the predefined group, wherein the first and second TFP values are independent. The first and second TFP values applied by the at least one processor 12 may be determined by information that the first communication node 10 receives from the second communication node 20. For instance, the TFP values may be derivable from a property of the received code blocks. Alternatively or additionally, the first and second TFP values may be signaled separately. The TFP values may be controlled at the transmitting end or decided at the receiving end. For instance, the first communication node 10 may be configured to apply a specific TFP value to one or more final code block in a predefined group. Alternatively, the first communication node 10 determines a property of the code block it receives, which then limits the number of available processing options available for selection by the first communication node 10. Further alternatively, at least one processor 12 may be configured to determine at least the second TFP value on the basis of statically or dynamically conveyed information indicating how much time is allowed for acknowledgment feedback, according to a predefined or pre-agreed rule, containing pairs of values of the time allowed for acknowledgment feedback and corresponding second TFP values.

The many possible options for signaling the TFP values include the following:

The receiver 11 receives an indication of a difference between the first and second TFP values, and either the first or second TFP value is derivable from the received code blocks or from other signaling.

The receiver 11 retrieves the first and second TFP values from a semi-statically configured set of values, such as a set of values known to the receiver 11 by higher-layer signaling, in particular RRC signaling. The semi-statically configured set of values may be accessible to both the first communication node 10 and the second communication node 20.

The receiver 11 is configured to receive an indication of the first TFP value as downlink control information (DCI) from the second communication node 20. The first TFP value is preferably indicated explicitly. As used herein, an explicit indication may mean that the receiver 11 receives the TFP value itself or a reference to a look-up table where it is found; values needing to be deducted from other settings or that are incrementally coded may generally be characterized as implicit rather than explicit.

In a variation of the preceding implementation, the first TFP value is in the DCI and the second TFP value is the first TFP value increased by a offset, such as a semi-statically configured offset.

In an alternative variation of the preceding implementation, the DCI further includes an indication of the second TFP value.

Envisioned are also combinations of the listed options.

As used in this disclosure, TFPs include one or more of the following:
parameters relevant to the modulation of data, including parameters which quantitatively or qualitatively describe the modulation;
code rate of a channel code;
code block size of a channel code;
channel code type;
OFDM symbol duration;
OFDM subcarrier bandwidth;
modulation order;
reference signal density;
power allocation;
multiple-input multiple-output (MEW) order or rank of transmission.

The at least one processor 12 may be configured to process a received code block by realizing a processing scheme in accordance with the TFP value with which the code block is associated. In particular, the at least one processor 12 may be configured to process a received code block by performing a processing scheme according to the TFP value with which the code block is associated. For each implementation, there exist at least two different TFP values such that the realizations in accordance with these TFP values are at least quantitatively different from one another, possibly also qualitatively different.

Figure 14:
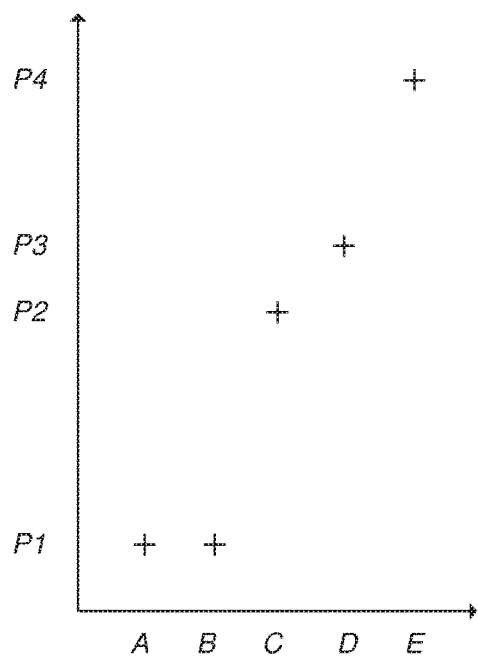
FIGS. 14-17 illustrate how a first communication node according to an embodiment realizes one or more processing schemes (vertical axis) in response to different TFP values (horizontal axis).
Figure 15:
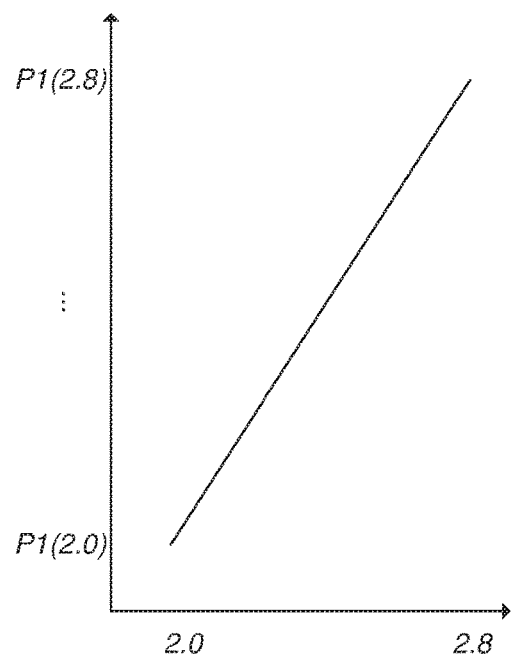
Figure 16:
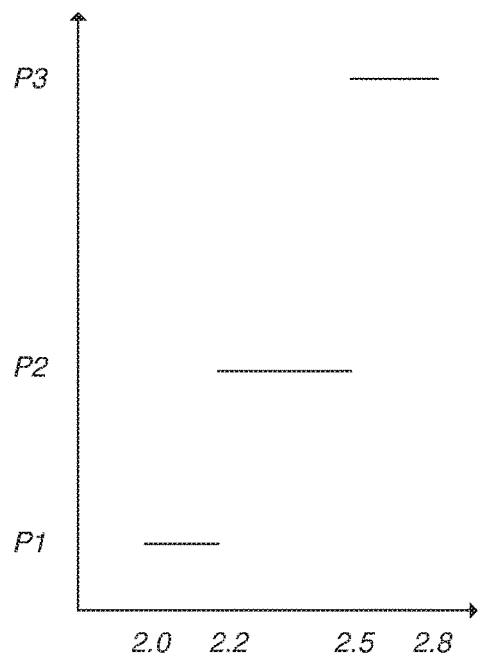
Figure 17:
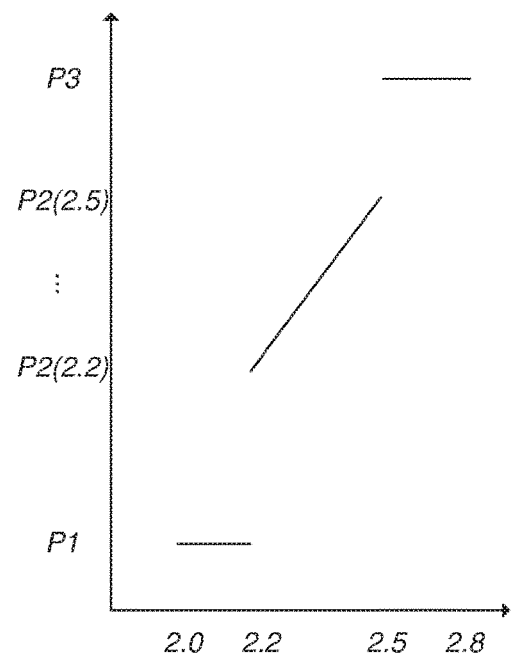

FIGS. 14-17 schematically illustrate different examples how the at least one processor 12 selects different realizations of a processing scheme or different processing schemes as a function of the TFP. In FIG. 14, points labeled on the horizontal axis represent values (scalars or vectors) of at least one discrete TFP, and points on the vertical axis represent different processing schemes selected in response to these. It is noted that processing scheme P1 is selected both for TFP values A and B. The processing schemes P1, P2, P3 and P4 may follow a common structure in which some step or steps are added or omitted (e.g., contributions from some frequency bands) or reordered, or are quantitatively modified by varying discrete or continuous numerical constants acting on the data to be processed. Alternatively, the processing schemes P1, P2, P3 and P4 represent different processing approaches, e.g., targeting channel code types requiring different demodulation, or involving different sequences of processing steps. In FIGS. 15-17, the horizontal axis represents a continuous TFP which takes values in an example interval [2.0, 2.81]. FIG. 15 illustrates the case where one processing scheme P1 is realized differently for different values of the continuous TFP. It is generally true that the properties of two realizations of the processing scheme are more similar the closer the TFP values are. Alternatively, as shown in FIG. 16, the at least one processor 12 may realize a same processing scheme (e.g., P1) for different values (e.g., 2.10, 2.11) of a TFP in a subrange; still the at least one processor 12 is operable to accept TFP values in a range where it realizes different processing schemes, such as processing schemes P1 and P2 in different portions of the open interval (2.0, 2.5). FIG. 17 illustrates a combination of what is shown in FIGS. 15 and 16, namely where successive subranges correspond, respectively, to a first constant single processing scheme P1, a variable single processing scheme P2(•) which is realized in a quantitatively variable manner reflecting the value of the TFP, and a second constant single processing scheme P3.

In embodiments, the realizations of the processing scheme(s) may differ with respect to
their probability of successful completion,
their necessary (or minimum) execution time, and/or
their cost, in the sense of how much resources they require in terms of processing or memory space or both.

A meaningful comparison of the successful completion probability could be based on predefined, representative input data; the representative input data may contain errors, which represents a difficulty that different processing schemes, depending on their degree of algorithmic sophistication and/or allocated resources, have different chances of overcoming. This makes it possible to expedite the processing in the first communication node in a way likely to accelerate its transmission of the acknowledgment in respect of a predefined group of code blocks, according to one of the approaches outlined above, while preserving link efficiency.

In particular, a predefined group of code blocks may be at least partially encoded by consecutive modulation symbols, such as an OFDM symbol, precoded OFDM symbol, discrete-Fourier-transform-spread OFDM (DFTS-OFD) symbol, multicarrier symbol, precoded multicarrier symbol. In a case where the code blocks are only partially encoded by consecutive modulation symbols, they may be interrupted by reference signal symbols, as is common practice in LTE transmission; even in this case, at least some portion of the predefined group of code blocks is encoded by two or more consecutive modulation symbols. Where the predefined group of code blocks is at least partially encoded by consecutive modulation symbols, in the sense described, the at least one processor 12 is operable to realize the processing scheme in such manner that a necessary execution time for processing a modulation symbol is significantly less than the duration of a modulation symbol (i.e., such that a measurable improvement results; or not approximately equal to the duration of a modulation symbol). It is common design practice to allocate processing resources with the aim that the necessary execution time for processing a modulation symbol approximately equals the duration of a modulation symbol. Indeed, allowing the processing time to exceed the duration of one symbol may lead to queues and poor resiliency, while the converse may represent uneconomical use of the processing resources if applied to all symbols. In general, it is possible to process data corresponding to a modulation symbol in significantly less time than the duration of a modulation symbol by allocating more processing resources for the processing of this data. In this embodiment, if the ability of at least one processor 12 to process a modulation symbol significantly faster than the duration of the symbol is applied to one or more of the final symbols in a predefined group, then the first communication node 10 will be able to transmit the acknowledgment earlier than a corresponding communication node according to the state of the art. If additionally such accelerated processing mode is applied only to the final symbol or symbols, the acceleration will not consume a significant amount of resources.

In a first group of embodiments, the at least one processor 12 of the first communication node 10 may be configured to detect errors on a per-code-block basis. The at least one processor 12 is further configured to accept a predefined group where the first subset (as defined by the assignment of TFP values) does not include the one or more code block which are most recent. Reference is made to the code block or code blocks that were transmitted by the second communication node 20 most recently, as evidenced by sequence numbers or the like, preferably not by the time of successful receipt at the first communication node 10, which may not reflect the time of an original transmission. In embodiments within this group, the transmitter 13 is configured to transmit an acknowledgment for the predefined group which is independent of any error detection results for said most recent code block or code blocks. The communicating parties operating the first and second communication nodes 10, 20 have typically agreed, e.g., by adhering to an industry standard such as 3GPP LTE, on a format for transmitting the acknowledgment. In such a standardized format, it may have been supposed or implicitly supposed that the acknowledgment for a predefined group of two or more code blocks be based on a combination of error detection results for all code blocks in the predefined group. In an embodiment, the acknowledgment may be sent in the agreed format even though it is based on a combination of error detection results for a subset of the code blocks in the predefined group. In particular, a negatively valued acknowledgment in respect of a predefined group of code blocks may be transmitted in the form of a request for retransmission of that predefined group of code blocks. Accordingly, this embodiment may be implemented on the receiving side unnoticeably to the transmitting side; this provides for easily achievable compatibility with legacy equipment.

It is noted that, even if the first communication node 10 transmits a positively valued acknowledgment that turns out to be factually incorrect (i.e., the error detection results missing from the combination are such that they would have led to a negative value of the acknowledgment), then a retransmission protocol operating independently of the acknowledgment feedback at the focus of this disclosure may ensure that the incorrectly or unsuccessfully decoded data will eventually become available to the first communication node 10.

Figure 9:
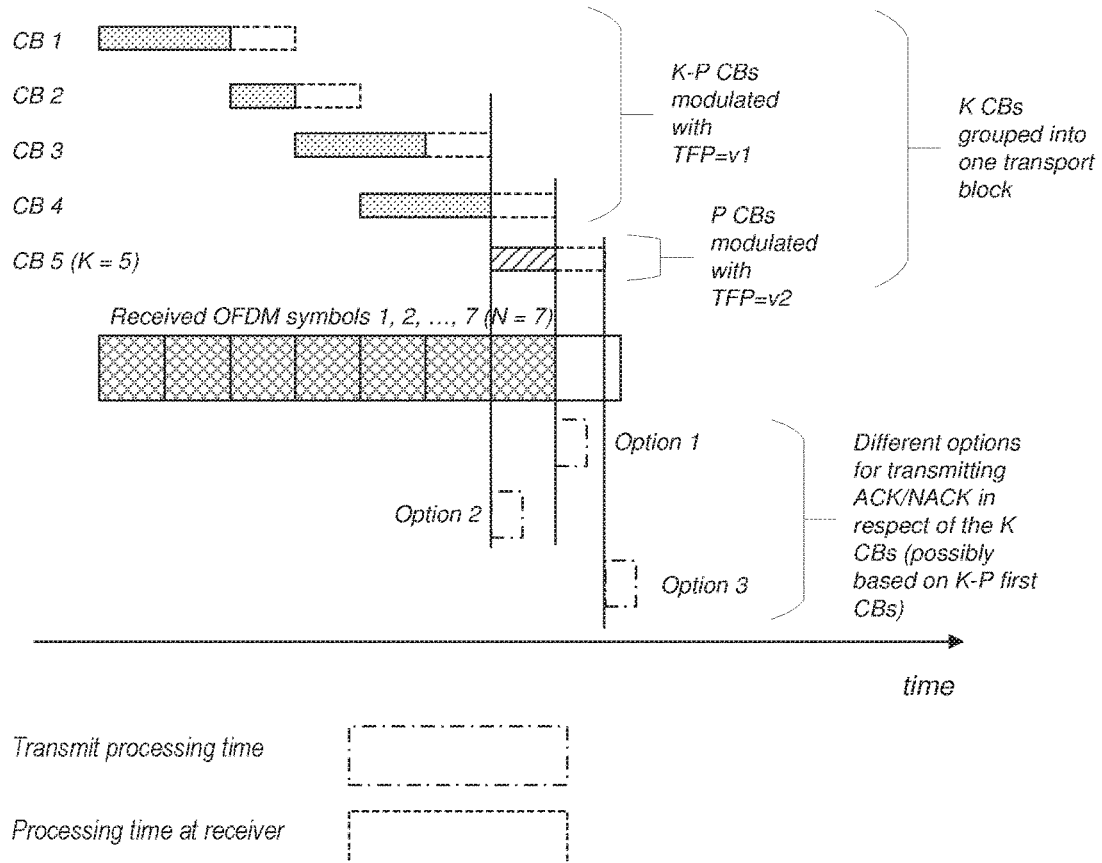
FIG. 9 illustrates three options for timing of acknowledgment feedback in respect of a group of code blocks, according to embodiments disclosed herein, wherein periods of transmit processing time have been indicated by dash-dotted line and periods of processing time at the receiver have been indicated by dashed line.

FIG. 9 shows an example in the context of LTE, wherein a code block may be referred to precisely as "code block" and a predefined group of code blocks may be referred to as a "transport block". The invention is applicable to any communication system where a transport block consists of multiple code blocks or frames. In FIG. 9 is shown a transport block comprising K=5 code blocks ("CB") encoded by N=7 OFDM consecutive symbols, which are arranged with respect to a horizontal time axis indicating their respective times of receipt. A solid rectangle corresponding to the duration of one OFDM symbol is shown to the right of the last OFDM symbol. No transmission time is associated with a code block as such, but an adjacent dashed rectangle to the right of each code block area illustrates the time interval in which the receiving side processes a code block, including error detection for that code block.

Immediately above the time axis, three possible time periods for preparing and transmitting an acknowledgment in respect of the transport block are indicated. Transmit processing time is understood as the time required from the availability of ACK/NACK feedback information in the UE until the part of the feedback message that depends on the ACK/NACK feedback is ready for transmission. Accordingly, the beginning of each time period refers to initiation of the acknowledgment transmission, which may include one or more of the following: populating a feedback message template with the value of the acknowledgment, retrieving supplementary information to accompany acknowledgment, initiating processing to generate such supplementary information, ensuring compliance with an agreed message format, or the like. This means that the first communication node 10 may perform some actions before the illustrated transmit processing time starts: begin building a feedback message, retrieve supplementary information to accompany acknowledgment, generate supplementary information and the like. It is furthermore understood that the end of each illustrated time period refers to starting the generation of an electromagnetic waveform that carries the acknowledgment. As such, the transmission stricto sensu is contained in a time period (not shown) immediately succeeding the illustrated transmit processing time.

In an embodiment illustrated in FIG. 9 as option 1, transmit processing starts after the last OFDM symbol is received but before the last code block has been decoded (dashed rectangle). The associated ACK/NACK feedback refers to the full transport block ("predefined group"), but is based only on code block 1, 2, 3 and 4 (or more generally, on the code blocks in the range [1, K-P] with P=1). In this option, even though all code blocks are eventually decoded, only code blocks that are mapped to the M=6 first OFDM symbols are used for the ACK/NACK feedback. Generalizing this teaching into cases where the last symbol does not encode a single code block, an acknowledgment for the predefined group may be based on a combination of error detection results for all but those code blocks which are at least partially encoded by the final OFDM symbol in the sequence. Using the notation from above, one sets M=N−1. The duration of one OFDM symbol may be of the order 50-100 μs in an available wireless communication system in view of transmit processing time, guard time and receiver processing time. With reference again to the case P=1, if code block 5 is associated with a TFP value that gives it increased robustness compared to the K-P first code blocks, then the prediction is likely to be more accurate and robust. Put differently, the TFP value associated with block 5 causes the at least one processor 12 to realize a processing scheme that has relatively higher robustness than what is used for earlier code blocks. The at least one processor 12 may be configured to process the first subset and the remainder using respective realizations of a processing scheme that differ with respect to robustness. As an alternative or addition to this, the TFPs of the last OFDM symbol can be set to enable higher robustness. The responsibility for determining the TFP values may be located on the transmitting side, such as the second communication node 20. Typically the first communication node 10 may notice that different code blocks or OFDM symbols are associated with different TFP values—in some implementations this may in fact be necessary to ensure correct processing on the receiving side—but may not be aware of the reason why the values have been set in this way.

As regards future communication systems, such as 5G, the inventors have realized that it may be advantageous to base an acknowledgment for a predefined group of code blocks on a combination of error detection results for all but those code blocks which are at least partially encoded by the final modulation symbol. This is because the duration of a modulation symbol is likely to be set in view of the processing times and guard time, whereby scaling divergence is avoided.

Still with reference to FIG. 9, option 1, the value of the acknowledgment depends only on error detection results for code blocks belonging to the first subset. The acknowledgment is preferably independent of any error detection results for the code blocks belonging to the remainder of the predefined group. It is not essential that errors be detected for the code blocks in the reminder of the predefined group. Possibly, and as may be unnoticeable to the first communication node 10, the second TFP value (applying to the remainder) is set in such manner as to make its processing more error robust. This justifies an assumption that the error probability for the code blocks in the remainder is bounded above by (i.e., is always less than or equal to) the error probability for the code blocks in the first subset. Based on this assumption, if the error status of the first subset is used as an indicator for the error status of the remainder, it is unlikely to produce false positive values.

In an embodiment illustrated in FIG. 9 as option 2, transmit processing starts before the last OFDM symbol is received. In this example, all but the last two code blocks are decoded. The associated ACK/NACK feedback transmission refers to the full transport block, but is based only on code blocks 1, 2 and 3 (P=2). In this option, only code blocks that are mapped to the first M=5 OFDM symbols are used for the ACK/NACK feedback. Still in an example where P=2, if code blocks 4 and 5 ("remainder") are associated with TFP values that give them increased robustness compared to code blocks 1, 2, . . . , K-P ("first subset"), then the prediction is likely be more accurate and robust. Additionally or alternatively, the TFPs of the last two OFDM symbols may be set to enable higher robustness.

It is a common trait of the embodiments illustrated as options 1 and 2 that transmission of the acknowledgment is initiated before the first communication node 10 has completed detection of errors in all code blocks in the predefined group. In particular, transmission of the acknowledgment is initiated before the at least one processor 12 has completed error detection on at least one code block outside said subset.

In a variation to the embodiments illustrated as options 1 and 2, the first communication node 10 may base the acknowledgment on error detection results for code blocks that are non-consecutive; this is to say, the "first subset" is a collection of non-consecutive code blocks. It can furthermore be envisioned to base the acknowledgment on error detection results for code blocks that are non-initial in the predefined group of code blocks. Further still, the acknowledgment may be based on an irregular sequence, such as code blocks 1, 3 and 4 in the case N=5. Especially if the error detection is separate from the decoding processing, such exclusion of some non-endpoint code blocks may represent a reduction of the processing load. Since consecutive code blocks are strongly correlated, as the inventors have realized, excluding some non-endpoint code blocks only reduces the reliability by a negligible amount.

There may be a tradeoff associated with the embodiments illustrated as options 1 and 2 in FIG. 9. If too few code block are used for ACK/NACK feedback, then the risk of sending an ACK for a transport block that does in fact fail to decode (due to decoding of one of the last code blocks failing) increases. If too many code blocks are included, then guard time is unnecessarily long. Finding a suitable balance between these extreme conditions is believed to be within the abilities of one skilled in the art who has studied the present disclosure. As already intimated, the probability of a failure may be advantageously reduced if the one or more most recent code blocks, which do not influence the value of the acknowledgment, are associated with a TFP value causing the at least one processor 12 to realize the processing scheme with relatively higher robustness; for instance, the one or more most recent code blocks may be placed in the "remainder" of the predefined group and the associated "second TFP value" is one leading to such increased robustness.

How much earlier the acknowledgment is transmitted depends on how much back-off of the TFPs is performed. The cost in terms of link spectral efficiency also depends on the back-off of the TFPs. In a TDD system or half-duplex FDD systems, uplink transmission can only start after the downlink transport block has been received. It is furthermore common practice to separate downlink reception and uplink transmission by a guard period (or guard time), mainly in order to reduce interference at the base station. The guard period may be included also where the uplink transmission is subject to a terminal-specific timing advance, as is particularly important in cells with large extent. In LTE, the guard period is at least the duration of one OFDM symbol. This places a limit on how early the acknowledgment can be transmitted. With reasonable assumptions on transmit processing time, guard time and processing time at the receiver, an advantageous choice may be M=N−1 (or P=1), that is, any code block that is mapped to the last OFDM symbol does not contribute the value of the acknowledgment.

It is finally noted that some features of the first group of embodiments have been discussed in detail in the applicant's co-pending International application PCT/SE2016/050150, in particular FIG. 9 therein together with corresponding sections of the description, which is hereby included by reference.

A second group of embodiments, illustrated in FIG. 9 as option 3, can be implemented both in a first communication node 10 where the at least one processor 12 is adapted to detect errors on the level of separate code blocks and in a first communication node 10 where the at least one processor 12 is configured to detect errors on the level of a predefined group. In the first case, the at least one processor 12 uses check values associated with code blocks as input, whereas in the second case, it uses check values associated with the predefined group of code blocks as a whole. In this group of embodiments, transmit processing begins after all code blocks in the downlink transmission have been received and decoded. The ACK/NACK feedback related to the predefined group of code block then is based on all code blocks. To expedite the sending of the acknowledgment, the first subset is selected so as not to include the most recent code block or code blocks in the predefined group, and the at least one processor 12 is configured to process the first subset and the remainder using respective realizations of a processing scheme that differ with respect to necessary execution time.

In this disclosure, "necessary execution time" may be understood as specific necessary execution time or necessary execution time per modulation symbol, e.g., the time needed to process a received OFDM symbol. Execution time may be based on a complexity analysis (or run-time complexity) of a representative algorithm in the processing scheme or alternatively on simulations of the processing scheme or actual measurements on the processing scheme executing. A comparison of the execution time for two different realizations of the processing or two different processing schemes—may neither require a complete complexity analysis nor measurements: it may be sufficient to determine whether a costly processing step is present in one and absent in the other, or if a relatively more costly processing step in one is substituted for a relatively less costly processing step in the other. In this connection, cost mainly refers to computational cost or necessary processing time, and to some extent to use of memory space.

The processing scheme may execute in less time because the encoding is less involved. Alternatively, it may be possible to apply a simpler and thus faster realization of the processing scheme—or a qualitatively different processing scheme—because the robustness of the encoding is so much higher. Put differently, this alternative allows using a processing scheme that is in itself more error-prone, because the encoding it acts on is less error-prone.

Advantageously, the most recent code block or code blocks are processed using a faster realization of the processing scheme, or using a processing scheme which is faster than the processing scheme that is used for the first subset, i.e., the less recent potion of the predefined group of code blocks.

Figure 10:
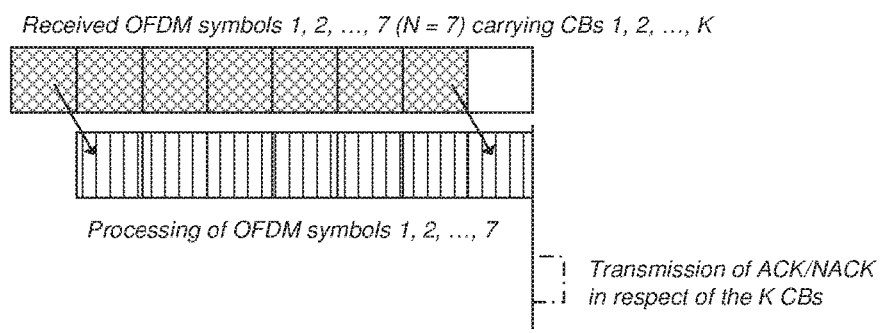
FIG. 10 illustrates processing of OFDM symbols (as exemplified by arrows) in a pipelining receiver running at full capacity, wherein normally, transmit processing can only start one OFDM symbol duration after complete receipt of the last OFDM symbol.
Figure 11:
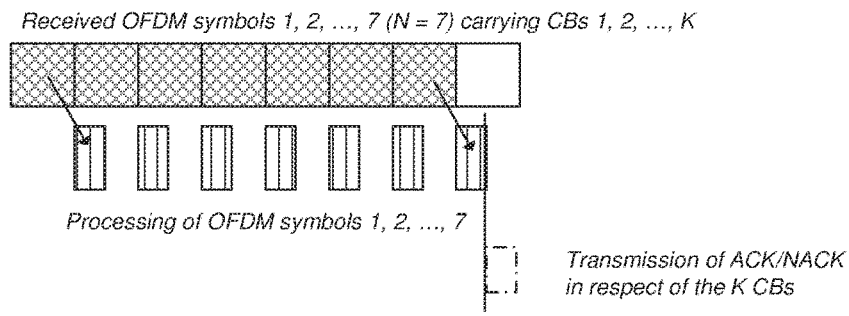
FIG. 11 illustrates processing in a receiver where TFPs in all code blocks have been modified to make processing faster, so that acknowledgment processing may start earlier than in FIG. 10.
Figure 12:
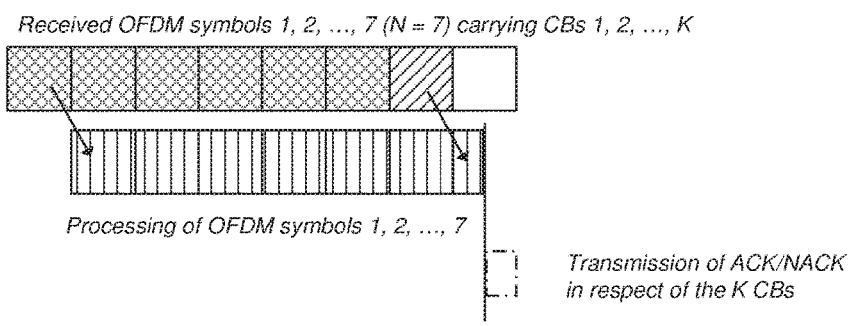
FIG. 12 illustrates processing in a receiver where TEN in the last OFDM symbol are modified to make processing faster, so that acknowledgment processing may start earlier than in FIG. 10 while the link efficiency is only marginally reduced.

The embodiment is further explained with reference to FIGS. 10 and 12. For reference purposes, FIG. 10 illustrates processing of OFDM symbols (as exemplified by arrows) in a pipelining receiver running at full capacity wherein, normally, transmit processing can only start one OFDM symbol duration after complete receipt of the last OFDM symbol. FIG. 11 illustrates processing in a receiver where TFPs in all code blocks have been modified to make processing faster, so that acknowledgment processing may start earlier than in FIG. 10; this may however be a costly way of accelerating the acknowledgment. FIG. 12 illustrates processing in a receiver where TFPs in the last OFDM symbol are modified to make processing faster, so that acknowledgment processing may start earlier than in FIG. 10 while the link efficiency is only marginally reduced.

Figure 13:
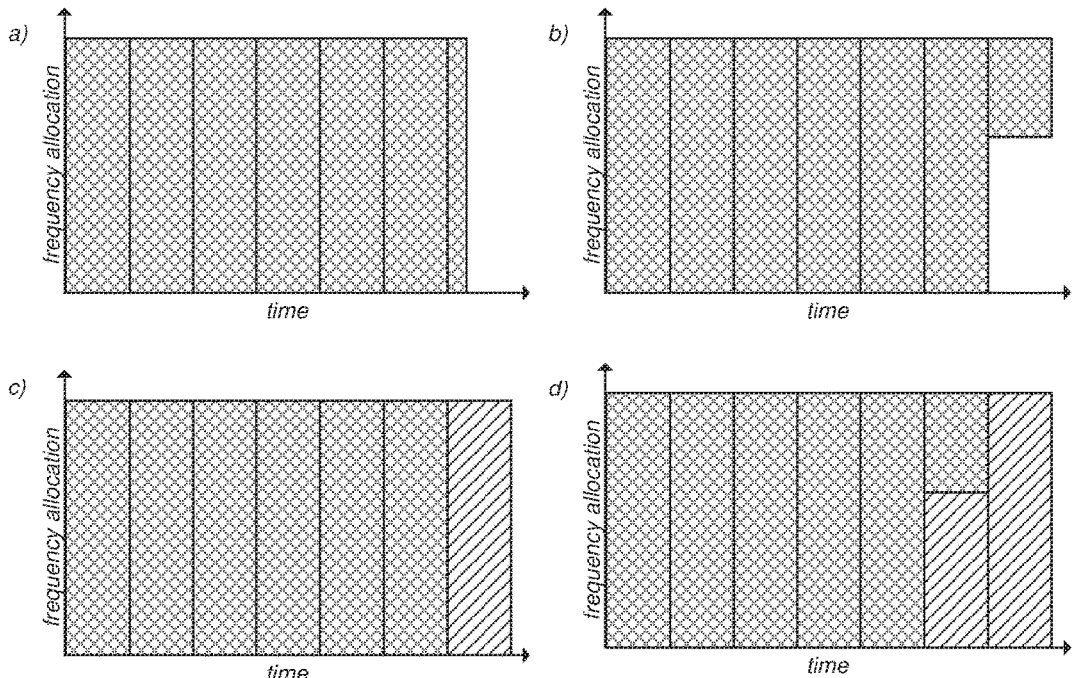
FIG. 13 shows frequency allocations to a sequence of seven OFDM symbols, according to various embodiments, wherein (a) a processing time for the final OFDM symbol is reduced, (b) a different frequency allocation is applied for the final OFDM symbol, (c) other TFPs than frequency allocation are modified in the final OFDM symbol to achieve more robust processing, and (d) TFPs are modified for a part of an OFDM symbol, as may be the case if TFP are assigned per code block, to reduce processing time or increase robustness.

Common to both groups of embodiments, FIG. 13 illustrates how different TFPs may be varied in order to expedite the acknowledgment for a predefined group of code blocks. Seven consecutive OFDM symbols that carry a LTE-type transport block are represented by rectangles. The vertical extent of a rectangle represents what frequencies are allocated to its transmission, and its horizontal extent represents the time duration of different OFDM symbols. In a), the duration of the final OFDM symbol is reduced by selecting its TFP value accordingly. In b), a different frequency allocation, which is an example of a TFP, is applied for the final OFDM symbol, whereas this symbol may have the same duration as the initial symbols in the predefined group. In c), as suggested by the different hashing pattern, a different TFP than frequency allocation is modified in the final OFDM symbol to achieve more robust processing. Finally in d), TFPs are modified for a part of an OFDM symbol, as may be the case if TFP are assigned per code block, to reduce processing time or increase robustness. It is clear in each of a) to d) that the acknowledgment may be transmitted earlier than with available technology, so that the guard time can be advantageously reduced.

Figure 2:
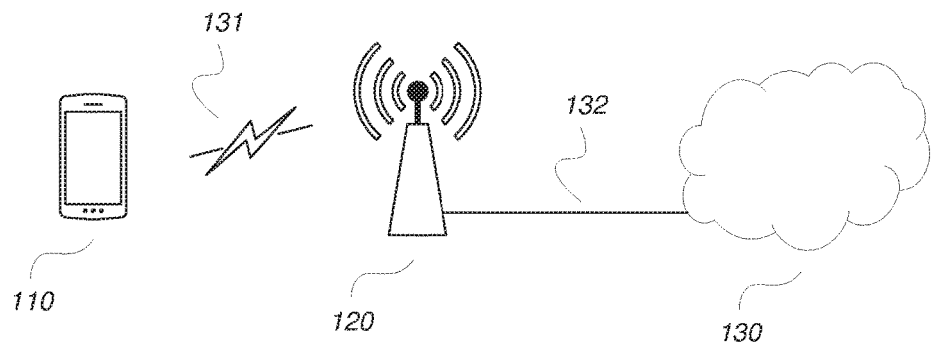
FIG. 2 illustrates a use case where an embodiment is implemented in an acknowledged connection between a wireless communication device (e.g., terminal, mobile station, user equipment) and a wireless access node (e.g., base station, eNodeB)

FIG. 2 shows a portion of a wireless network including a core network 130, a base station 120 and a UE 110. The base station 120 is connected over a wired (or fixed) connection 132 to the core network 230 and over a wireless downlink connection 131 to the UE 110. Both connections 131, 132 may be error-prone to some extent and may benefit from the teachings disclosed herein. In an embodiment, the UE 110 performs error detection on code blocks received over the downlink connection 131 and sends acknowledgments to the base station 120 on an uplink (not shown), wherein one TFP value is applied for some code blocks in a predefined group and an independent TFP value is applied for a remainder of the code blocks in the predefined group.

Figure 3:
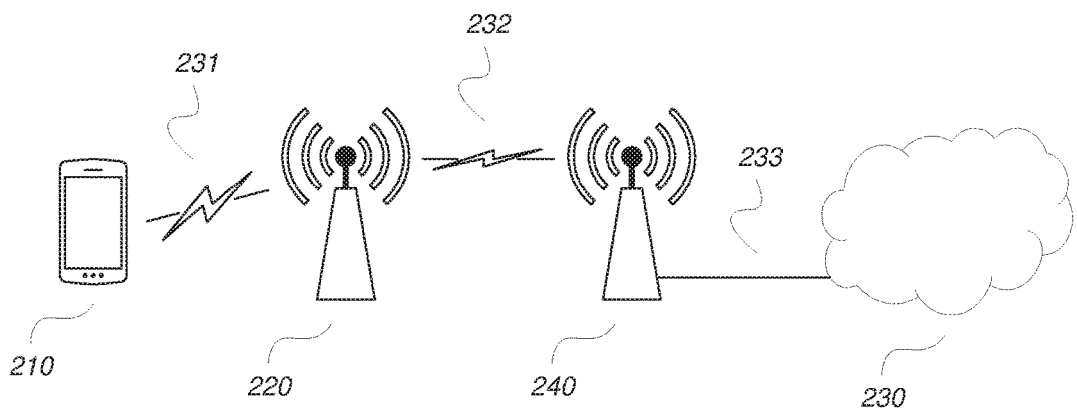
FIG. 3 illustrates a use case where an embodiment is implemented in a backhaul link between two wireless access nodes (e.g., base stations, eNodeBs)

FIG. 3 shows a portion of a wireless network including a core network 230, a first and second base station 240, 220 and a UE 210. The first base station 240 is connected over a wired (or fixed) connection 233 to the core network 230 and over a backhaul connection 232 to the second base station 220. The second base station 220 is in turn connected wirelessly to the UE 210, and thereby acts as a relay. All three connections 231, 232, 233 may be error-prone to some extent and may benefit from the teachings disclosed herein. In an embodiment, the second base station 220 performs error detection on code blocks received over the backhaul connection 232 and sends acknowledgments to the first base station 240, wherein one TFP value is applied for some code blocks in a predefined group and an independent TFP value is applied for a remainder of the code blocks in the predefined group.

The wireless networks discussed with reference to FIGS. 2 and 3 may be cellular networks, such as LTE (including LTE-Advanced) or a 5G wireless network. Each of the wireless connections 131, 231, 232 may be a time-division duplex (TDD) connection, a full frequency-division duplex (FDD) or half-duplex FDD connection, a proper full duplex connection.

In the case of an LTE network, the predefined group of code blocks may be referred to as a transport block. In a 5G or younger wireless communication system, the phrase "predefined group of block" may need to be reinterpreted in view of a possible change of the term "code block", as already discussed. Whether or not such reinterpretation is necessary in future communication technologies, the "predefined group" is to be understood as a unit which the receiving side is required (e.g., through agreement, standardization or the like) to acknowledge independently, and typically within a predefined time after transmission. Embodiments disclosed herein teach that in such a "predefined group", one TFP value is applied for some code blocks and an independent. TFP value is applied for a remainder of the code blocks therein.

In the case of an LTE network, alternatively or additionally, the acknowledgment may be transmitted on a physical uplink control channel, PUCCH.

Figure 4:
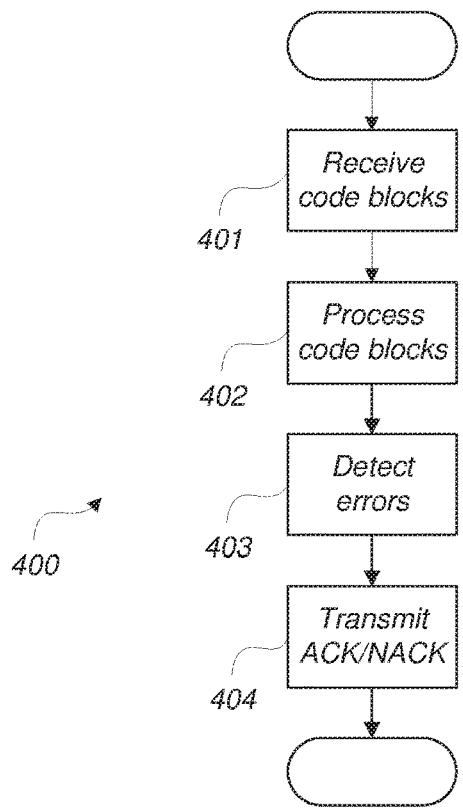
FIGS. 4 and 5 are flowcharts of a method in a (receiving) first communication node and a (transmitting) second communication node, respectively.

The operation of the first communication node 10 may be summarized by the method 400 illustrated in FIG. 4. The method 400 comprises a first step 401 of receiving a stream of code blocks from the second communication node, wherein each code block or each predefined group of code blocks is associated with a check value enabling error detection and belongs to a predefined group of code blocks. The method 400 further comprises a second step 402 of processing the received code blocks in accordance with at least one TFP; a third step 403 of detecting errors in received code blocks using the check value or check values; and a fourth step 404 of transmitting to the second communication node an acknowledgment in respect of each predefined group of code blocks, wherein a negative value of the acknowledgment signifies that an error was detected for at least one of the code blocks in the predefined group. In an embodiment, the second step 402 includes applying a first TFP value for a first subset of the code blocks of a predefined group and a second TFP value for a remainder of the code blocks of the predefined group, wherein the first and second TFP values are independent in the sense discussed above; in particular the first and second TFP values may be different.

Figure 8:
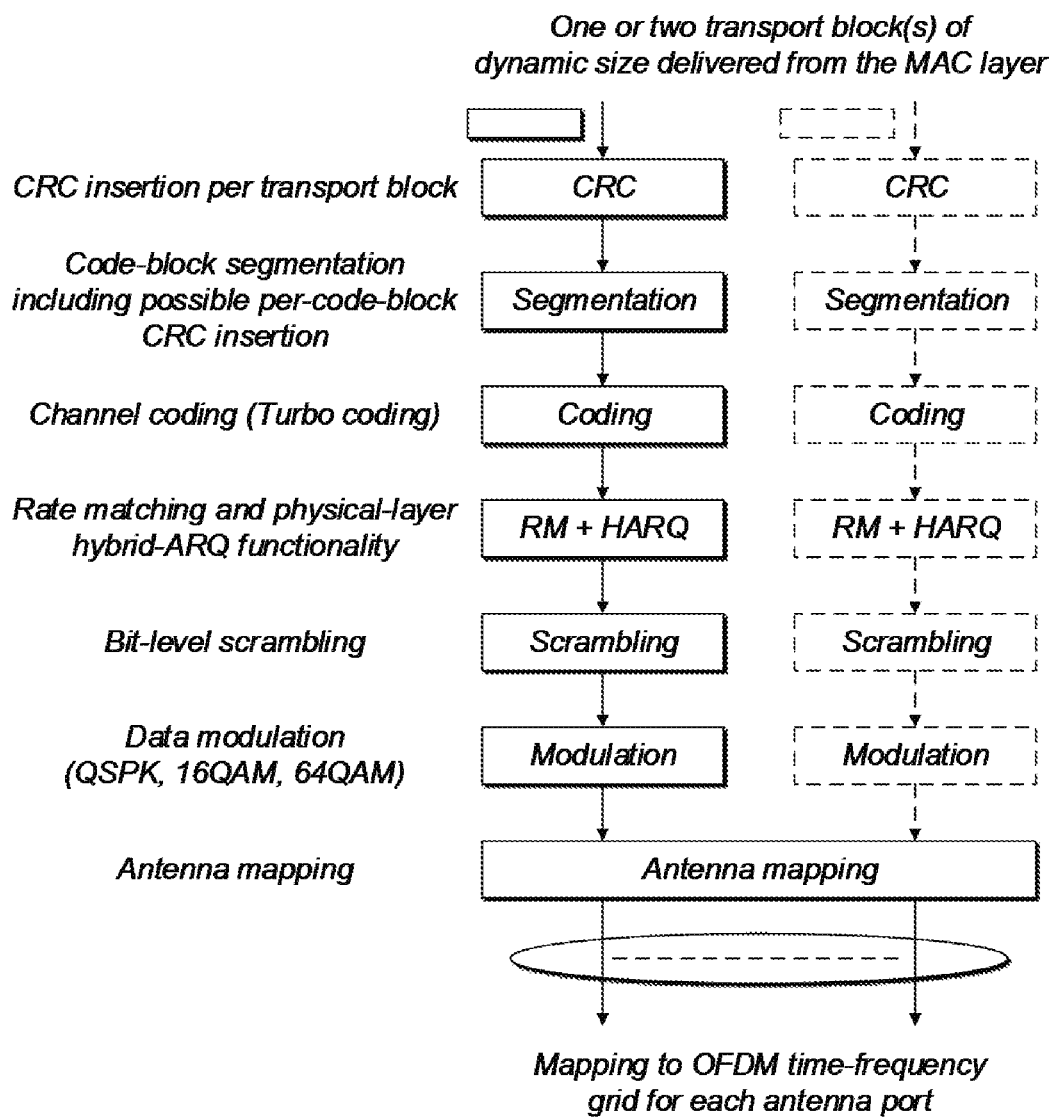
FIG. 8 is an overview block diagram illustrating transport-channel processing in 3GPP LTE.

Resuming the description of FIG. 1, the second communication node 20 is adapted for transmitting a stream of code blocks over a connection, which may be an acknowledged connection in the sense discussed above, to the first communication node 10. The second communication node 20 comprises at least one processor 21, a transmitter 22 and a receiver 23. The at least one processor 21, which may be implemented as a single processor, a multi-core processor, a group of cooperating processors, or processing circuitry, is configured to process the code blocks in accordance with at least one TFP. Example processing steps are shown in FIG. 8. As exemplified above, the TFPs may affect modulation, coding and transmission and therefore typically affect both the transmitting and receiving sides, that is, both the first 10 and second 20 communication nodes. The at least one processor 21 is further configured to group the processed code blocks into predefined groups and associate each code block with at least one check value; alternatively, it is further configured to associated each predefine group with at least one check value. The transmitter 22 is configured to transmit the predefined groups of code blocks. The receiver 23 is configured to receive an acknowledgment from the first communication node, wherein the acknowledgment concerns one of the predefined groups of transmitted code blocks. If the receiver 23 determines that the received acknowledgment is negatively valued, it causes the concerned predefined group of transmitted code blocks to be retransmitted, or retransmits the predefined group of transmitted code blocks. For this purpose, the second communication node 20 may further comprise a buffer shown) for temporarily storing transmitted code blocks or data carried by transmitted code blocks. In normal operation, the content of the buffer is deleted or marked as allowed to be deleted or overwritten once it has been positively acknowledged from the receiving side. In an embodiment, the at least one processor 21 is further configured to process a first subset of the code blocks of a predefined group in accordance with a first TFP value and to process a remainder of the code blocks of the predefined group in accordance with a second TFP value. The first and second TFP values are independent in the sense that they are allowed to be different; preferably, they may also assume equal values in limited periods of time.

The at least one processor 21 of the second communication node 20 accepts using or applying independent TFP values when processing code blocks and the corresponding processing in the first communication node 10 is performed in accordance with these TFP values. As such, the second communication 20 influences the first communication node 10 in a manner likely to accelerate its transmission of the acknowledgment in respect of a predefined group of code blocks, as discussed above. The second communication node 20 may benefit from accelerated acknowledgment by receiving the acknowledgment earlier than it would with available technology. This may reduce the average time that not yet acknowledged data needs to be buffered in the second communication node, and so reduces the need for buffering, i.e., the necessary for memory space. Independently of the buffering-related advantage, a decrease in the average time to acknowledgment may also reduce the likelihood of the so-called window stall phenomenon, wherein a limited availability of protocol data unit (PDU) sequence numbers compels a transmitting side to withhold data until some of the transmitted PDUs have been acknowledged and, as a result, their sequence numbers released. If the average time between a transmission and a (positive) acknowledgment of the transmitted data is relatively smaller, the size of the PDU sequence number space will have a relatively less limiting influence on the maximum stall-free transmission rate. This may imply that fewer PDU header bits may be devoted to the PDU sequence number. The fact that a potentially costlier TFP value need not be applied to all code blocks in a predefined group helps preserve link efficiency.

In an embodiment, the second communication node 20 may be configured to assign the first and second TFP values such that the corresponding processing (i.e., processing in the first communication node 10, such as decoding symbols in the code blocks) of a code block associated with the second TFP value has a relatively higher probability of success than the corresponding processing of a code block associated with the first TFP value. This will increase the reliability of a predictive acknowledgment, i.e., one that the first communication node 10 generates independently of the error detection status of code blocks belonging to the remainder of the predefined group of code blocks. This has been disclosed above as the first group of embodiments on the receiving side. The increased reliability may meant that the predictive acknowledgment produces relatively fewer false positive values.

In an embodiment, the second communication node 20 may be configured to assign the first and second TFP values such that the corresponding processing (i.e., processing in the first communication node 10) of a code block associated with the second TFP value has a relatively shorter necessary execution time than the corresponding processing of a code block associated with the first TFP value. In a first communication node 10 configured to transmit an acknowledgment that is based on a combination of the error detection status of all code blocks in a predefined group, this is likely to reduce the time elapsing from receipt of data to transmission of a corresponding acknowledgment. This has been disclosed above as the second group of embodiments on the receiving side. Preferably, necessary processing time for the second TFP value is significantly less than the duration of one modulation symbol.

In an embodiment, the first subset does not include (i.e., is short of) the $P \geq 1$ code blocks in the predefined group which are most recent in the stream of code blocks. Assigning a special TFP value ("second TFP value") to these code blocks, which may bring about a higher cost, may be particularly advantageous in that these code blocks will normally be processed last in order in the first communication node 10. This is reasonable both in the case of predictive acknowledgment, where the most recent code blocks cannot directly trigger a retransmission, and in the case of deterministic acknowledgment, where the processing of the most recent code blocks delay the completion of the acknowledgment and hence delay the time at which they it is transmitted to the second communication node 20. In a further development, the second communication node 20 is configured to adapt the number P in response to one or more of the following factors:

the size of the code blocks in the predefined group;

the number of code blocks that the predefined group comprises;

the content of statically conveyed information regarding a time allowed for acknowledgment feedback;

the content of dynamically conveyed information regarding a time allowed for acknowledgment feedback;

an active acknowledgment feedback timing mode that has been selected from a plurality of selectable acknowledgment feedback timing modes and is currently valid;

current timing advance settings, which may be determined by the second communication node 20 if this is acting as base station in a cellular system and which may affect the link budget.

Example ways in which the TFP values may be signaled from the second communication node 20 to the first communication node 10 have been discussed in detail above, including the option of using DCI for this purpose and various incremental formats.

Figure 5:
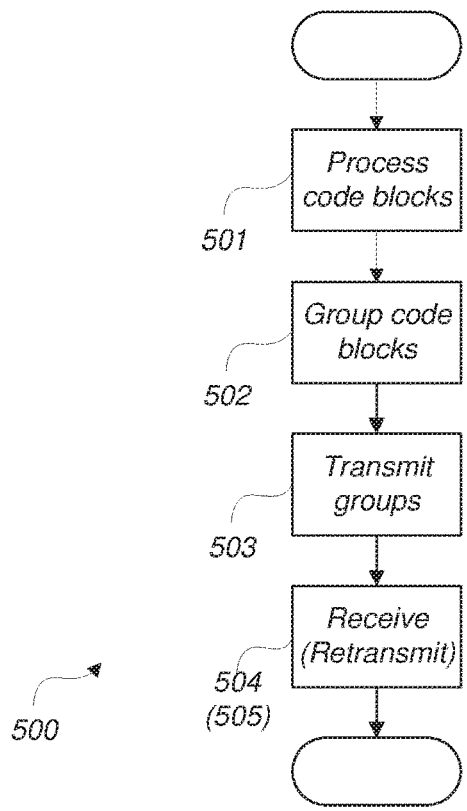
Figure 6:
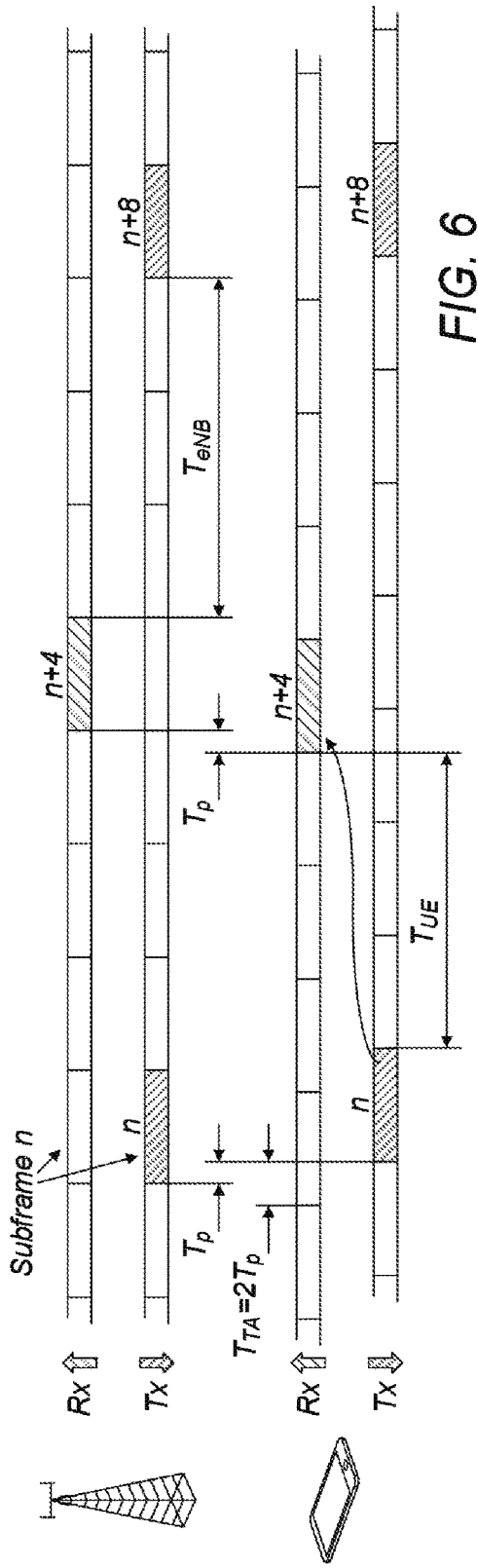
FIGS. 6 and 7 are schematic timing diagrams illustrating hybrid-ARQ in 3GPP LTE FDD and TDD, respectively.
Figure 7:
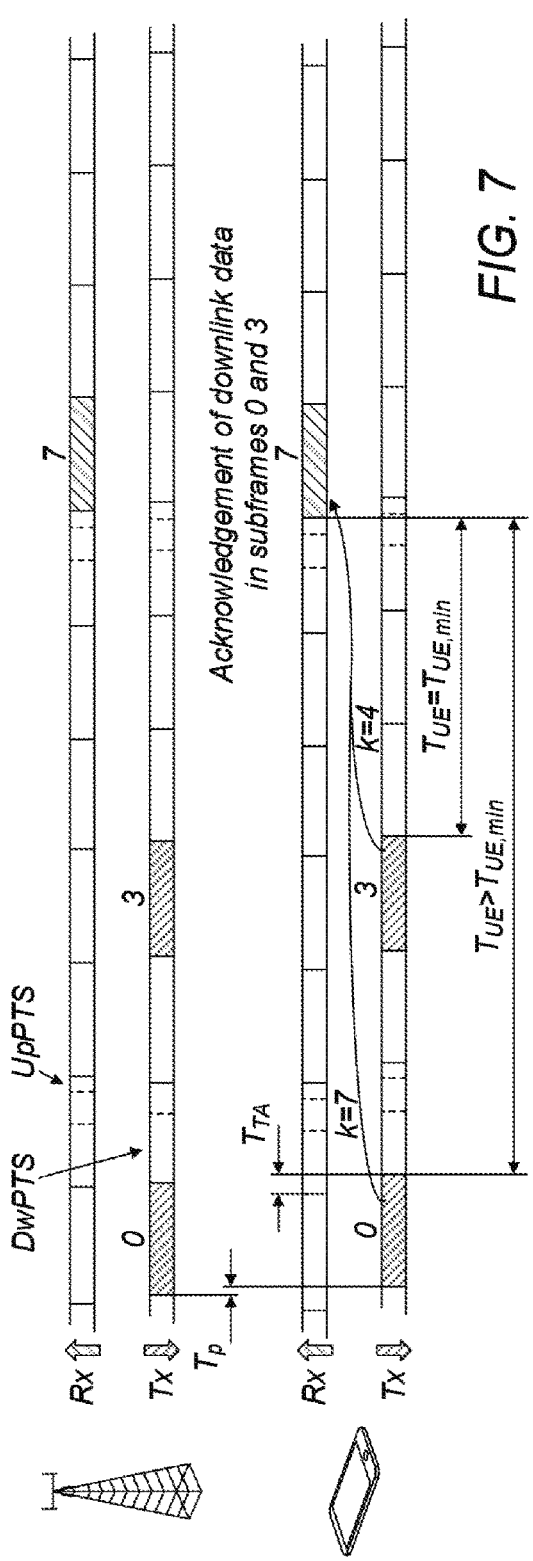

The operation of the second communication node 20 may be summarized by the method 500 illustrated in FIG. 5. The method 500 comprises a first step 501 of processing the code blocks in accordance with at least one TFP and a second step 502 of grouping-unless this has been done in upstream processing steps—the processed code blocks into predefined groups and associating each code block or each predefined group of code blocks with a check value. The method 500 further comprises a third step 503 of transmitting the predefined groups of code blocks; a fourth step 504 in which the second communication node 20 receives an acknowledgment in respect of one of the predefined groups of transmitted code blocks from the first communication node 10; and a fifth step 505 where the second communication node 20 retransmits the predefined group of transmitted code blocks. In an embodiment, the first step 501 includes applying a first TFP value when processing a first subset of the code blocks of a predefined group and applying a second TFP value when processing a remainder of the code blocks of the predefined group. The first and second TFP values are independent in the sense discussed initially; in particular they may be different.

Embodiments herein also include a computer program comprising instructions which, when executed by at least one processor of a first 10 or second 20 communication node, cause the communication node to carry out the methods shown in FIGS. 4 and 5, respectively, or variations thereof. In one or more embodiments, a carrier containing the computer program is one of communication media (or transitory media, such as an electronic signal, optical signal, radio signal) or computer readable storage media (or non-transitory media). The term computer storage media includes both volatile and nonvolatile, removable and non-removable media implemented in any method or technology for storage of information; computer storage media includes but is not limited to RAM, ROM, EEPROM, flash memory or other memory technology, CD-ROM, digital versatile disks or other optical disk storage, magnetic cassettes, magnetic tape, magnetic disk storage or other magnetic storage devices, or any other medium which stores the desired information and is accessible by a computer. In at least one embodiment, a communication node or other apparatus is configured to perform the operations or functions disclosed herein, based at least in part on node processing circuitry executing computer program instructions stored in a non-transitory computer-readable medium.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A first communication node for receiving code blocks over an acknowledged connection to a second communication node, comprising:
   a receiver configured to receive a predefined group of code blocks from the second communication node, wherein each code block or the predefined group of code blocks is associated with a check value enabling error detection;
   processing circuitry configured to:
      process the received code blocks in accordance with at least one transport format parameter (TFP); and
      detect errors in the received code blocks using the check value or check values; and
   a transmitter configured to transmit to the second communication node an acknowledgment indicating whether at least one error was detected in the predefined group,
   wherein the processing circuitry is configured to apply a first TFP value for a first subset of the code blocks of a predefined group and a second TFP value for a remainder of the code blocks of the predefined group, wherein the first and second TFP values are independent.

2. The first communication node of claim 1, wherein the processing circuitry is configured to process a received code block by realizing a processing scheme in accordance with a TFP value associated with the received code block, wherein the processing circuitry is operable to accept a TFP range across which realizations are at least quantitatively different.

3. The first communication node of claim 2, wherein realizations of the processing scheme in accordance with distinct TFP values differ with respect to one or more of:
   probability of successful completion;
   necessary execution time; and
   necessary processing or memory resources.

4. The first communication node of claim 3, wherein:
   a predefined group of code blocks comprises code blocks at least partially encoded by consecutive modulation symbols; and
   the processing circuitry is configured to realize the processing scheme in such manner that a necessary execution time for processing a modulation symbol is less than the duration of a modulation symbol.

5. The first communication node of claim 1, wherein:
the processing circuitry is configured to detect errors on a per-code-block basis;
the first subset does not include the P≥1 most recent code blocks in the predefined group; and
the transmitter is configured to transmit an acknowledgment for the predefined group which is independent of any error detection results for said most recent code blocks.

6. The first communication node of claim 5, wherein the transmitter is configured to initiate transmission of the acknowledgment before the processing circuitry has completed detection of errors in all code blocks in the predefined group.

7. The first communication node of claim 1, wherein:
the first subset does not include the P≥1 most recent code blocks in the predefined group;
the processing circuitry is configured to process the first subset and the remainder using respective realizations of a processing scheme that differ with respect to necessary execution time; and
the transmitter is configured to transmit an acknowledgment for the predefined group which is based on a combination of error detection results for all code blocks of the predefined group.

8. The first communication node of claim 1, wherein the acknowledged connection to the second communication further comprises a retransmission protocol.

9. The first communication node of claim 1, wherein the first communication node is a user equipment, the second communication node is a base station and the acknowledged connection is a downlink.

10. The first communication node of claim 1, wherein the first and second communication nodes are base stations and the acknowledged connection is a wireless backhaul link or a relay link.

11. The first communication node of claim 1, wherein the first and second communication nodes are user equipments and the acknowledged connection is a sidelink.

12. The first communication node of claim 1, wherein the at least one TFP is one or more of the following:
parameters relevant to the modulation of data;
code rate of a channel code;
code block size of a channel code;
channel code type;
orthogonal frequency-division modulation (OFDM) symbol duration;
OFDM subcarrier bandwidth;
modulation order;
reference signal density;
power allocation; and
MIMO order or rank of transmission.

13. A second communication node for transmitting a stream of code blocks over an acknowledged connection to a first communication node, comprising:
processing circuitry configured to process the code blocks in accordance with at least one transport format parameter (TFP), group the processed code blocks into predefined groups and associate each code block or each predefined group with at least one check value;
a transmitter configured to transmit the predefined groups of code blocks; and
a receiver configured to:
receive from the first communication node an acknowledgment in respect of one of the predefined groups of transmitted code blocks; and
cause retransmission of said predefined group of transmitted code blocks in response to a negatively valued acknowledgment,
wherein the processing circuitry is configured to process a first subset of the code blocks of a predefined group in accordance with a first TFP value and to process a remainder of the code blocks of the predefined group in accordance with a second TFP value, which is independent of the first TFP value.

14. The second communication node of claim 13, wherein the processing circuitry is configured to select the second TFP value such that corresponding processing of a code block in the first communication node has a relatively higher probability of success with the second TFP value than with the first TFP value.

15. The second communication node of claim 13, wherein the processing circuitry is configured to select the second TFP value such that a necessary execution time for corresponding processing of a code block in the first communication node is relatively shorter with the second TFP value than with the first TFP value.

16. The second communication node of claim 15, wherein:
the predefined group comprises code blocks at least partially encoded by consecutive modulation symbols; and
the necessary execution time for corresponding processing of a modulation symbol is less than the duration of a modulation symbol with the second TFP value.

17. The second communication node of 13, whose cost of one or more of processing a code block and transmitting the code block differs between the first and second TFP values.

18. The second communication node of 13, wherein the first subset does not include the P≥1 code blocks in the predefined group which are most recent in the stream of code blocks.

19. The second communication node of claim 18, wherein the processing circuitry is configured to adapt the number P in response to one or more of the following factors:
size of the code blocks in the predefined group;
number of code blocks in the predefined group;
statically conveyed information on time allowed for acknowledgment feedback;
dynamically conveyed information on time allowed for acknowledgment feedback;
an active acknowledgment feedback timing mode of a plurality of selectable acknowledgment feedback timing modes; and
current timing advance settings.

20. The second communication node of claim 13, wherein the first communication node is a user equipment, the second communication node is a base station and the acknowledged connection is a downlink.

21. The second communication node of claim 13, wherein the first and second communication nodes are base stations and the acknowledged connection is a wireless backhaul link or a relay link.

22. The second communication node of claim 13, wherein the first and second communication nodes are user equipments and the acknowledged connection is a sidelink.

23. The second communication node of claim 13, wherein the at least one TFP is one or more of the following:
parameters relevant to the modulation of data;
code rate of a channel code;
code block size of a channel code;
channel code type;

orthogonal frequency-division modulation (OFDM) symbol duration;
OFDM subcarrier bandwidth;
modulation order;
reference signal density;
power allocation; and
MIMO order or rank of transmission.

24. A method implemented in a first communication node for receiving a stream of code blocks from a second communication node, comprising:
receiving a stream of code blocks from the second communication node, wherein each code block or each predefined group of code blocks is associated with a check value enabling error detection and belongs to a predefined group of code blocks;
processing the received code blocks in accordance with at least one transport format parameter (TFP);
detecting errors in received code blocks using the check value or check values; and
transmitting to the second communication node an acknowledgment in respect of each predefined group of code blocks, wherein the acknowledgment indicates whether at least one error was detected in the predefined group,
wherein said processing includes applying a first TFP value for a first subset of the code blocks of a predefined group and a second TFP value for a remainder of the code blocks of the predefined group, wherein the first and second TFP values are different.

25. A method implemented in a second communication node for transmitting a stream of code blocks to a first communication node, comprising:
processing the code blocks in accordance with at least one transport format parameter (TFP);
grouping the processed code blocks into predefined groups and associating each code block or each predefined group of code blocks with a check value;
transmitting the predefined groups of code blocks;
receiving from the first communication node an acknowledgment in respect of one of the predefined groups of transmitted code blocks; and
in response to a negatively valued acknowledgment, retransmitting said predefined group of transmitted code blocks,
wherein said processing includes applying a first TFP value for a first subset of the code blocks of a predefined group and applying a second TFP value for a remainder of the code blocks of the predefined group, wherein the first and second TFP values are different.

26. A non-transitory computer readable storage medium of a first communication node storing a computer program for receiving code blocks over an acknowledged connection to a second communication node, the computer program comprising instructions that, when executed by at least one processor of the first communication node, cause the first communication node to:
receive a predefined group of code blocks from the second communication node, wherein each code block of the predefined group or the predefined group as a whole is associated with a check value enabling error detection;
process the received code blocks in accordance with at least one transport format parameter (TFP);
detect errors in the received code blocks using the check value associated with the predefined group as a whole or check values for respective code blocks of the predefined group;
transmit to the second communication node an acknowledgment indicating whether at least one error was detected in the predefined group; and
apply a first TFP value for a first subset of the code blocks of a predefined group and a second TFP value for a remainder of the code blocks of the predefined group, wherein the first and second TFP values are independent.

27. A non-transitory computer readable storage medium storing a computer program for transmitting a stream of code blocks over an acknowledged connection to a first communication node, the computer program comprising instructions that, when executed by at least one processor of a second communication node, cause the second communication node to:
process the code blocks in accordance with at least one transport format parameter (TFP), group the processed code blocks into predefined groups of code blocks and associate each code block of a respective predefined group or each respective predefined group as a whole with at least one check value;
transmit the predefined groups of code blocks;
receive from the first communication node an acknowledgment corresponding to one of the predefined groups of transmitted code blocks;
cause retransmission of said predefined group of transmitted code blocks in response to a negatively valued acknowledgment; and
process a first subset of the code blocks of a predefined group in accordance with a first TFP value and to process a remainder of the code blocks of the predefined group in accordance with a second TFP value, which is independent of the first TFP value.

* * * * *